United States Patent
Abe et al.

(10) Patent No.: US 7,440,137 B2
(45) Date of Patent: Oct. 21, 2008

(54) APPARATUS, PROGRAM, MEDIUM FOR IMAGE-AREA SEPARATION, IMAGE PROCESSING AND IMAGE FORMING

(75) Inventors: Yasushi Abe, Kanagawa-ken (JP); Masaaki Ishikawa, Tokyo (JP); Takashi Saitoh, Kanagawa-ken (JP)

(73) Assignee: Ricoh Company, Ltd. (JP)

( * ) Notice: Subject to any disclaimer, the term of this patent is extended or adjusted under 35 U.S.C. 154(b) by 817 days.

(21) Appl. No.: 10/620,363

(22) Filed: Jul. 17, 2003

(65) Prior Publication Data
US 2004/0174567 A1    Sep. 9, 2004

(30) Foreign Application Priority Data
Jul. 17, 2002    (JP)    ............... 2002-208209

(51) Int. Cl.
*G06F 15/00*    (2006.01)
*H04N 1/40*    (2006.01)
(52) U.S. Cl. .................. 358/2.1; 358/3.24; 382/176
(58) Field of Classification Search ................ 382/173, 382/176; 358/2.1, 462, 1.1, 1.9, 3.24
See application file for complete search history.

(56) References Cited

U.S. PATENT DOCUMENTS

| 5,317,652 | A | * | 5/1994 | Chatterjee | .................. 382/304 |
| 6,580,804 | B1 | | 6/2003 | Abe | |
| 6,771,834 | B1 | * | 8/2004 | Martins et al. | .............. 382/257 |
| 2001/0040978 | A1 | | 11/2001 | Abe | |
| 2003/0095272 | A1 | * | 5/2003 | Nomizu | ....................... 358/1.9 |

FOREIGN PATENT DOCUMENTS

JP    2777378    4/1990
JP    05-284358    10/1993

OTHER PUBLICATIONS

U.S. Appl. No. 09/583,603.
U.S. Appl. No. 08/539,334.
U.S. Appl. No. 08/241,999.
U.S. Appl. No. 08/211,266.
U.S. Appl. No. 08/211,433.
U.S. Appl. No. 08/088,044.

* cited by examiner

*Primary Examiner*—Thomas D Lee
(74) *Attorney, Agent, or Firm*—Dickstein Shapiro LLP

(57) ABSTRACT

An image-area separation apparatus includes a SIMD processor performing a SIMD process for performing an image-area separation process and an image-area separation mechanism for performing an image-separation operation according to the SIMD process performed by the SIMD processor. The image-area separating apparatus performs an image-area separation operation to separate character images from figure images by means of software while the SIMD-typed processor achieves a high-speed image data processing.

15 Claims, 16 Drawing Sheets

FIG. 5

| f00 | f01 | f02 |
|-----|-----|-----|
| f10 | f11 | f12 |
| f20 | f21 | f22 |

FIG. 6

| f00 | f01 | f02 | f03 | f04 |
|-----|-----|-----|-----|-----|
| f10 | f11 | f12 | f13 | f14 |
| f20 | f21 | f22 | f23 | f24 |
| f30 | f31 | f32 | f33 | f34 |
| f40 | f41 | f42 | f43 | f44 |

FIG. 14A

DOTTED IMAGE PIXEL | px1 | px2 | px3 | px4 | px5 |

DETERMINED AS DOTTED IMAGE BY t1 | ○ | × | × | × | × |

FIG. 14D w | | 0.9 | 0.8 | 0.7 | 0.6 |

FIG. 14E $t1_{new} = t1 * (1+w)$ | 80 | 65 | 23 | 35 | 78 |

FIG. 14F

DETERMINED AS DOTTED IMAGE BY $t1_{new}$ | ○ | × | × | × | ○ |

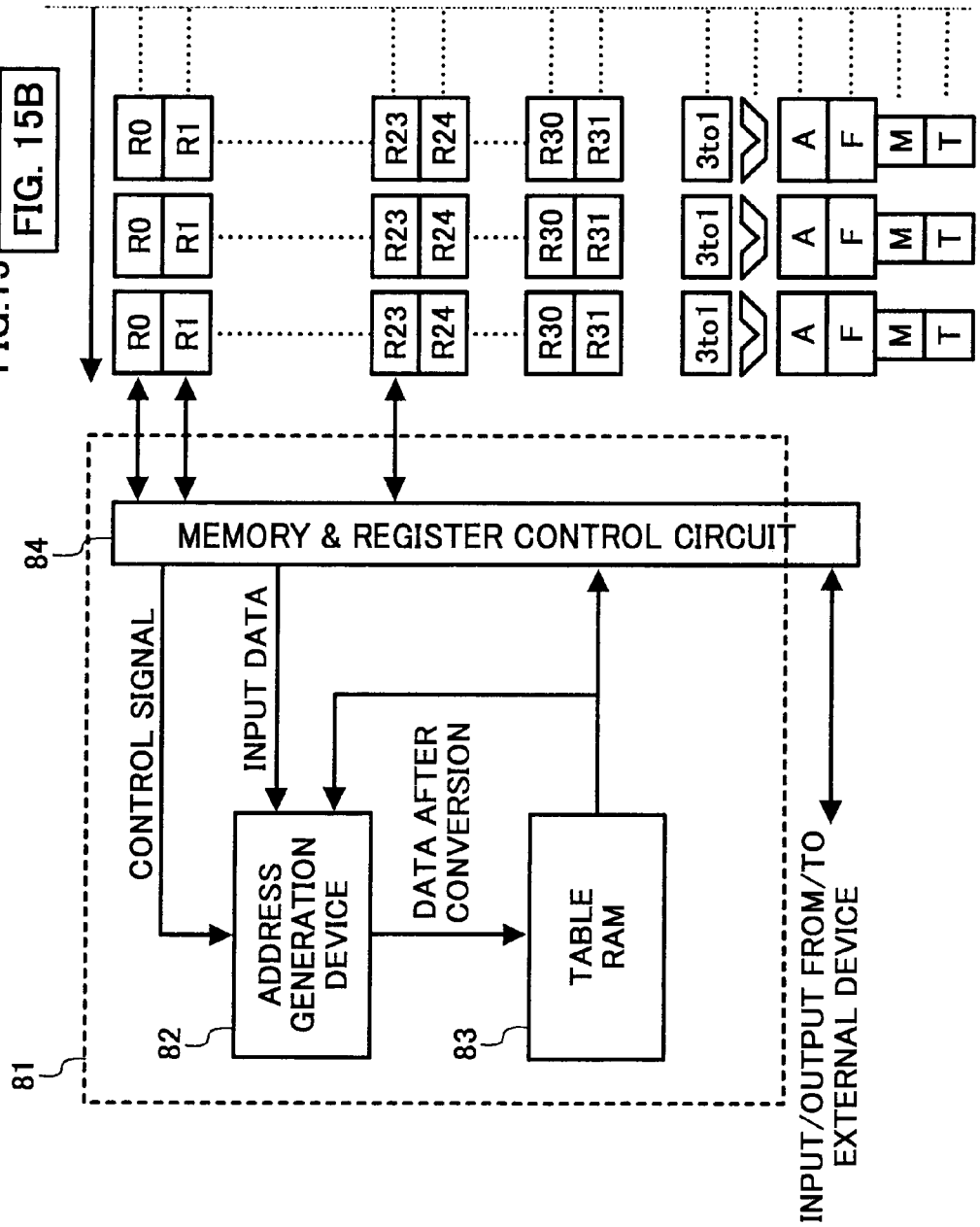

FIG. 16

| STATE (4BIT) | DESCRIPTION |
|---|---|
| 1010 | DOTTED IMAGE TEST PIXEL BY W=0, 0t=1 |
| 1001 | DISTANT BY ONE PIXEL FROM DOTTED IMAGE TEST PIXEL BY W=0.9, 0t=1 |
| 1000 | DISTANT BY TWO PIXELS FROM DOTTED IMAGE TEST PIXEL BY W=0.8, 0t=1 |
| 0111 | DISTANT BY THREE PIXELS FROM DOTTED IMAGE TEST PIXEL BY W=0.7, 0t=1 |
| 0110 | DISTANT BY FOUR PIXELS FROM DOTTED IMAGE TEST PIXEL BY W=0.6, 0t=1 |
| 0101 | DISTANT BY FIVE PIXELS FROM DOTTED IMAGE TEST PIXEL BY W=0.5, 0t=1 |
| 0100 | DISTANT BY SIX PIXELS FROM DOTTED IMAGE TEST PIXEL BY W=0.4, 0t=1 |
| 0011 | DISTANT BY SEVEN PIXELS FROM DOTTED IMAGE TEST PIXEL BY W=0.3, 0t=1 |
| 0010 | DISTANT BY EIGHT PIXELS FROM DOTTED IMAGE TEST PIXEL BY W=0.2, 0t=1 |
| 0001 | DISTANT BY NINE PIXELS FROM DOTTED IMAGE TEST PIXEL BY W=0.1, 0t=1 |
| 0000 | DISTANT BY TEN OR MORE OF PIXELS FROM DOTTED IMAGE TEST PIXEL BY W=0.0, 0t=1 |

FIG. 18

| RAM ADDRESS | | EXPLANATION |
|---|---|---|
| PREVIOUS STATE | INPUT | NEXT STATE |
| 0000 | 0 | 0000 |
| 0000 | 1 | 1010 |
| 0001 | 0 | 0000 |
| 0001 | 1 | 1010 |
| 0010 | 0 | 0001 |
| 0010 | 1 | 1010 |
| 0011 | 0 | 0010 |
| 0011 | 1 | 1010 |
| 0100 | 0 | 0011 |
| 0100 | 1 | 1010 |
| 0101 | 0 | 0100 |
| 0101 | 1 | 1010 |
| 0110 | 0 | 0101 |
| 0110 | 1 | 1010 |
| 0111 | 0 | 0110 |
| 0111 | 1 | 1010 |
| 1000 | 0 | 0111 |
| 1000 | 1 | 1010 |
| 1001 | 0 | 1000 |
| 1001 | 1 | 1010 |
| 1010 | 0 | 1001 |
| 1010 | 1 | 1010 |

APPARATUS, PROGRAM, MEDIUM FOR IMAGE-AREA SEPARATION, IMAGE PROCESSING AND IMAGE FORMING

This application is related to Japanese patent application, No. JPAP2002-208209, filed on Jul. 17, 2002 in the Japanese Patent Office, the entire contents of which are incorporated by reference herein.

FIELD OF INVENTION

The present invention relates to an image-area separation apparatus, an image processing apparatus, and an image forming apparatus. The present invention also relates to a program and a medium for image-area separation, image processing, and image forming.

BACKGROUND OF THE INVENTION

Recently, an image processing apparatus to perform an image processing of digital image data has been applied in copying machines, facsimiles, printers, scanners and so forth. In the above-described image processing apparatuses, image data are required to be processed more rapidly and for this purpose, the apparatuses have in recent years started to include hardware such as an Application Specified Integrated Circuit (ASIC).

When image data containing both a portion represented in dots such as pictures or photographs, for example, and another portion represented in line such as characters, for example, are output to a print medium, some measures need to be taken to eliminate moiré, for example for pictures and pattern portion so as to refine image quality and also some other measures need to be taken for characters, such as a clarification process, for example.

In order to automatically perform the above-described processes in compliance with respective image data, an image-area separation technology is known to automatically image-separate picture and pattern portions, respectively. Published Japanese Patent Application Laid-Open Publication No. 2777378 discloses the above-described image processing apparatus.

It is also well known that although different figures and different characters of image data have different attributes according to different pixels, respectively. The attributes of the pixels that are aligned adjacent tend to influence to each other to become nearly identical images. It is desired that the discrimination result associated with attributes be an area that has a dimension large enough to some extent so that the discrimination result allows the image data to be easily determined. Published Japanese Patent Laid-Open Publication No. 3256267 describes a technology in which to accurately obtain the character area from surrounding pixels when a pixel has been determined as a character, the pixels surrounding a pixel of interest is also easily determined as a character in accordance with the weight or probability with respect to the distance between the pixel which has been determined as a character and a specified pixel.

However, in conventional image processing apparatuses, a plurality of circuits may be pre-mounted or an ASIC may be exchanged when the contents of image processing data are required to be replaced, thus making it difficult to change the contents of the image processing apparatus with flexibility. It may also be considered an alternative to perform an image processing by changing software configuration using general-purpose microprocessors. However, this method has also a defect in that it takes a large amount of time to process data.

SUMMARY OF THE INVENTION

In view of the foregoing, it is an object of the present invention to provide a novel image-separating apparatus for performing an image-area separation operation to separate character images from figure images by means of software while a SIMD-(single instruction multiple data stream) typed processor achieves a high-speed image data processing.

Another object of the present invention is to provide a novel computer-readable program which performs an image-area separation operation to separate character images from figure images by means of software while the SIMD-typed processor achieves a high-speed image data processing.

Another object of the present invention is to provide a novel computer-readable media having stored thereon computer-executable instructions which perform an image-area separation operation to separate character images from figure images by means of software while the SIMD-typed processor achieves a high-speed image data processing.

A novel image-area separation apparatus in accordance with the invention includes a SIMD processor performing a SIMD process for performing an image-area separation process and image-area separation mechanism for performing an image-separation operation according to the SIMD process performed by the SIMD processor. The image-separation mechanism image-separates the image data into a character portion and a figure portion. The image-area separation apparatus further includes a plurality of characteristic test mechanisms for performing a plurality of characteristic tests to determine whether the image data have specific characteristics and a comprehensive test mechanism for determining a comprehensive test result according to the plurality of the characteristic tests mechanisms performed by the plurality of test mechanisms.

The characteristics test mechanisms include a characteristic test mechanism to determine whether the image data includes edge data; a characteristic test mechanism to determine whether the image data includes dotted image data, and a characteristic test mechanism to determine whether the image data includes line screen image data.

The comprehensive test mechanism is used to determine whether the image data includes a character portion, and whether the image data includes a figure portion. More specifically, the comprehensive test mechanism determines that the image data includes a character portion when the edge test mechanism determines the image data include at least one edge component, the dotted image test mechanism determines that the image data include no dotted image component, and the line screen test mechanism determines that the image data include no line screen. The comprehensive test mechanism determines that the image data include a figure portion when at least one of three events occurs in which: the edge test mechanism determines that the image data include no edge component; the dotted image test mechanism determines that the image data include one of at least dotted components; or the line screen test mechanism determines that the image data include at least one of line screen components.

In the image-area separation apparatus, the SIMD processor includes a register storing data forming a register file. The image-area separation apparatus further includes a data converter for converting data using the data as an address stored in the register wherein the image-area separation mechanism includes a data table converter connected to the SIMD processor for converting data of a data table using, as an address, data of a register provided to the SIMD processor, and performs the image-area separation operation by causing the SIMD processor to perform the SIMD process and the data table converter to perform a sequential operation. In the image-area separation apparatus, the image-area separation mechanism requests intermediate data in the SIMD process and performs the sequential operation for the intermediate data.

Further to achieve these and other objects, in one embodiment, a novel image-processing mechanism is provided for switching over contents of the image data in accordance with the result of the image-separation operation performed by the image-separation apparatus. The image forming apparatus includes an image reading apparatus to read an image of an original image data, an image-area separation apparatus which processes the read image of the original image data and the image-processing mechanism for switching over contents of the image data in accordance with the result of the image-separation operation performed by the image-separation apparatus and an image forming mechanism for forming an image onto a recording sheet in accordance with the image data read by the image reading apparatus.

Further, to achieve these and other objects, a novel computer-readable program for an image-area separation embodied on an information storage medium including processing routines executed by a SIMD processor includes the step of causing the SIMD processor to perform the image-area separation for image-separating the image data.

The image-area separation operation image-separates the image data into a character portion and a figure portion. The computer-readable program for the image-area separation also includes a plurality of characteristic test mechanisms for performing a plurality of characteristic tests to determine whether the image data have specific characteristics, and a comprehensive test mechanism for determining a comprehensive test result according to the plurality of the characteristic test mechanisms performed by the plurality of test mechanisms. In the computer-readable program, one of a plurality of the characteristic test processes is an edge test process to determine that the image data includes an edge component, a dot image test process to determine that the image data includes a dotted image component and a line screen test process to determine that the image data includes a line screen component. In the computer-readable program, the image-area separation process causes the SIMD-typed processor to execute the SIMD process and to perform the image-area separation by allowing a table converter which performs a table conversion in which register data of the register file of the SIMD-typed processor are an address to execute a sequential process. In the computer-readable program, the image-area separation calculates intermediate data and performs the sequential process in accordance with the intermediate data.

To achieve the above-mentioned object, a novel computer-readable medium having stored thereon computer-executable instructions which include the step of causing the SIMD processor to perform the image-area separation for image-separating the image data. In the computer-readable medium for the image-area separation, the image-area separation operation image-separates the image data into a character portion and a figure portion. The computer-readable medium for the image-area separation includes a plurality of characteristic test mechanisms for performing a plurality of characteristic tests to determine whether the image data have specific characteristics, and a comprehensive test mechanism for determining a comprehensive test result according to the plurality of the characteristic test mechanisms performed by the plurality of test mechanisms. One of the characteristic test processes is an edge test process to determine that the image data include an edge component. Another characteristic test processes is a dot image test process to determine that the image data include a dotted image component. Another characteristic test processes is a line screen test process to determine that the image data include a line screen components. In the computer-readable medium, the image-area separation process causes the SIMD-typed processor to execute the SIMD process and to perform the image-area separation by allowing a table converter which performs a table conversion in which register data of the register file of the SIMD-typed processor are an address to execute a sequential process. In the computer-readable medium, the image-area separation calculates intermediate data and performs the sequential process in accordance with the intermediate data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is an illustration showing an exemplary process of an edge determination;

FIG. 6 is an illustration showing an exemplary process of a dotted image determination;

FIG. 14 is an illustration showing detailed processes of FIG. 12;

FIG. 16 is an illustration showing a status associated with a table conversion using the table converter;

FIG. 18 is an illustration showing a table used in the table converter.

DETAILED DESCRIPTION OF PREFERRED EMBODIMENTS

Figure 1:
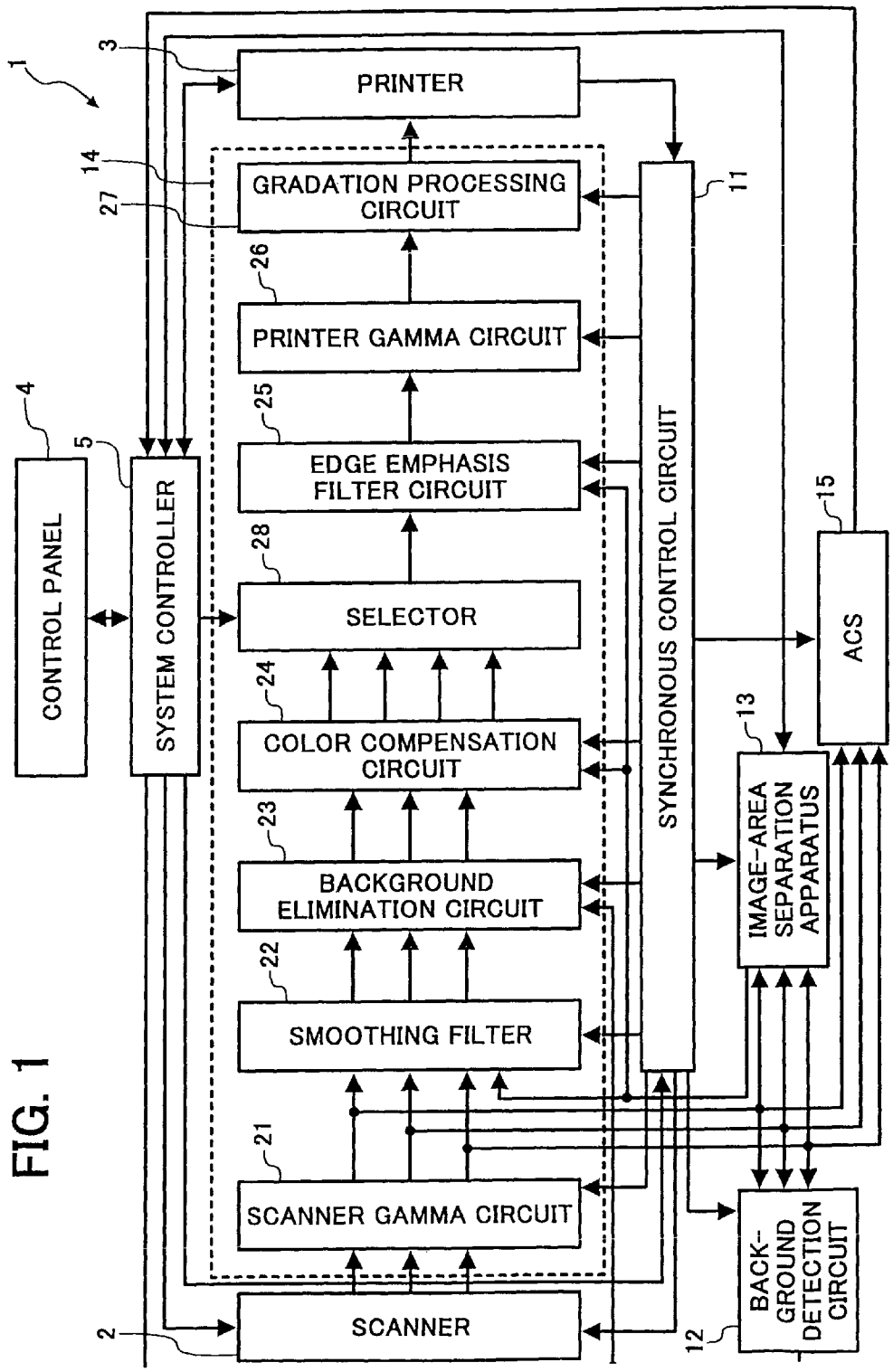
FIG. 1 is a block diagram showing an exemplary structure of the digital color copying machine according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a description is made for a multi-function machine 1 according to a preferred embodiment of the present invention. FIG. 1 is a block diagram of a multi-function machine 1 (hereinafter referred to as a copying machine 1). As illustrated in FIG. 1, the copying machine 1, an apparatus which embodies an image forming apparatus, includes a scanner 2, a printer 3, a control panel 4, a system controller 5, a synchronous control circuit 11, a background detection circuit 12, an image-area separation apparatus 13, an image processing unit 14, an Automatic Color Selection (ACS) 15. The image processing unit 14 of the copying machine 1 includes a scanner gamma circuit 21, a smoothing filter 22, a background elimination circuit 23, a color compensation circuit 24, an edge filter emphasis circuit 25, a printer gamma circuit 26, a gradation processing circuit 27 and a selector 28.

As shown in FIG. 1, the scanner 2 scans the entire original surface of an image and performs a digital signal processing of the read image. The printer 3 forms a color or a mono chrome image onto a recording sheet using color toner including magenta (M), cyan (C), yellow (Y) and black (Bk) using an electrographic method corresponding to the original image read by the scanner 2. The control panel 4 is operable with manipulation by a user and the system controller 5 which includes microcomputers controls the respective components of the copying machine 1. The synchronous control circuit 11 generates and supplies pulse signals to various circuits 21-27, which accept input data in synchronism with the pulse signals. The synchronous control circuit 11 also supplies pulse signals to the background detection circuit 12, which is used to detect the white background level of an original image that is read by the scanner 2.

The image-area separation apparatus 13 image-separates a figure portion from a character portion of the original image and the image processing unit 14 and the ACS 15 processes image data read by the scanner 2 to achieve an image processing operation and an image-area separation operation. The image processing unit 14 performs the image processing operation. The image processing unit 14 and the image-area separation apparatus 13 are used to perform the image-area separation operation. The scanner gamma circuit 21 which resides in the image processing unit 14 of the copying machine 1 converts raw image components read by the scanner to linear R, G, B image data. The smoothing filter 22 performs a smoothing process in the image-area separation operation and the image processing operation. The background elimination circuit 23 eliminates the white background of an original image.

The color compensation circuit 24 compensates the color image in the image processing operation. The edge emphasis filter circuit 25 performs an edge emphasis process and the printer gamma circuit 26 converts image data into a density linear after setting a curve in accordance with the characteristic of the printer 3. The gradation processing circuit 27 performs a gradation processing of image data to have a predetermined bit width (8 bits). The gradation processing circuit 27 and the selector 28 then outputs the processed image data to the printer 3. The color compensation circuit 24 converts the image data components of R, G and B into an image data components of Y, M and C, extracts the black color elements included in the composite part of the image data Y, M and C, forms the image data for the Bk out of Y, M and C color components by eliminating the black color elements and creates an image data containing the Y, M and C color elements. The selector 28 sequentially selects the respective electric signal containing color information from image data and outputs the selected signal containing the color information to the edge emphasis filter circuit 25.

Figure 2:
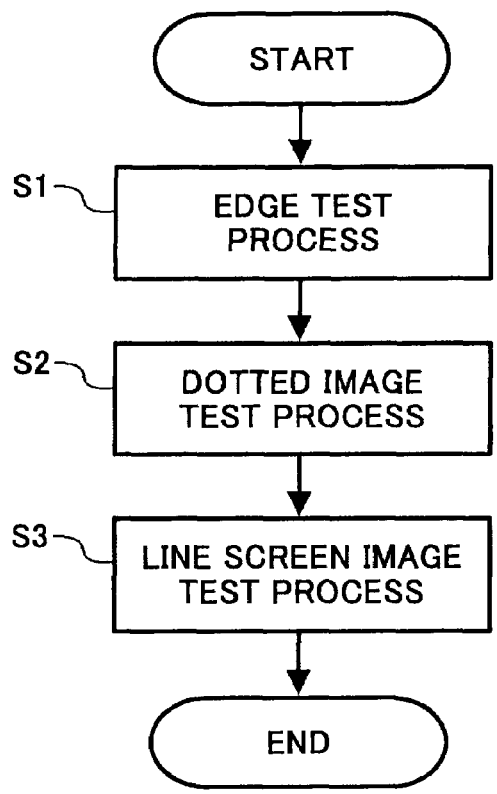
FIG. 2 is a block diagram showing an exemplary function of an image-area separation apparatus of the digital color copying machine.

Referring now to the image-area separation apparatus 13 of FIG. 2, a flowchart illustrating an exemplary process executed by a SIMD (a single instruction-stream multiple data-stream)-typed processor 41 as will be described later is shown. As illustrated in FIG. 2, the processes to be executed by the SIMD-typed processor includes a test process to determine whether or not specified image data contain an edge area portion in Step S1, a dotted test process to determine whether or not image data contain dots in Step S2 and a line screen test process to determine whether or not specified image data contain a line screen in Step S3. Based on each of the above-described Steps from S1 through S3, a Step S4 (not shown) is a process to determine whether image data are included in a character portion or a figure portion. After determining whether image data correspond to figures or characters, a comprehensive test process is executed in which test signals created based upon the above-described process of the test process are output to the image processing unit 14. Hence, the image-area separation process is performed to determine existence of a characteristic of image data according to each of the functions performed in the above-described processes.

Figure 13:
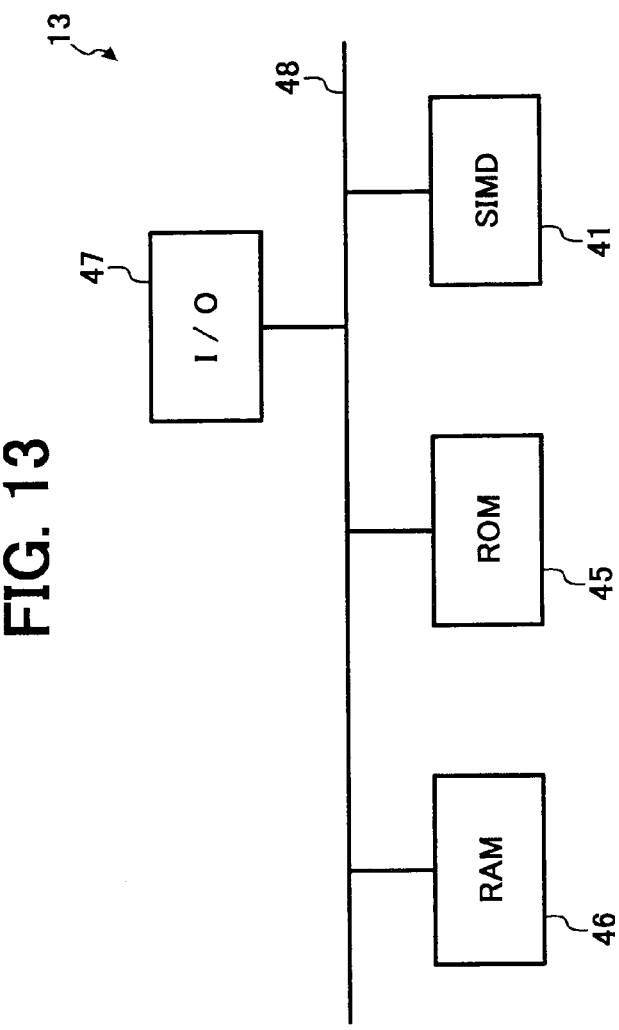
FIG. 13 is a block diagram showing an exemplary hardware composition of the image-area separation apparatus.

Referring now to FIG. 13, a block diagram shows a hardware structure of the image-area separation apparatus 13. As illustrated in FIG. 13, the image-area separation apparatus includes the SIMD-typed processor 41, a read-only memory (ROM) 45, a random-access memory (RAM) 46, an I/O port 44 (not shown), an I/O port 47 and an internal bus 48.

The SIMD-typed processor 41 performs various operations associated with the image-separation operation and makes a uniform control on each part of the image-area separation apparatus 13. The ROM 45 functions as a medium in the preferred embodiment of the present invention and stores various readable control programs and fixed data for the image-separation operation and the image processing operation. The RAM 46 stores various data which are rewritable and serves as a work area of the SIMD-typed processor 41. The RAM 46 is connected with the I/O port 47 through the internal bus 48. The ROM 45 allows the control programs for the image-separation operation which are stored in a flash memory to be downloaded and to be rewritten from an external equipment (not shown) through the I/O port 44.

Figure 3:
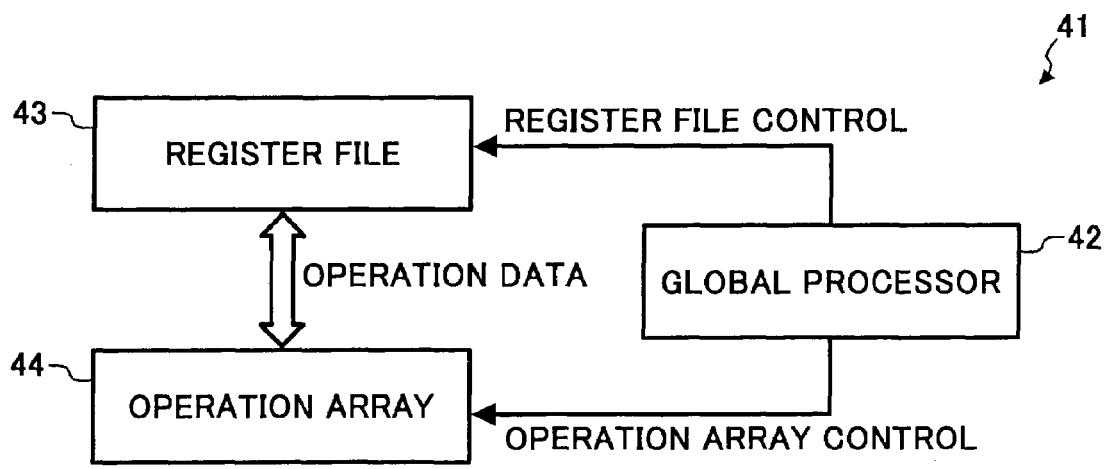
FIG. 3 is a block diagram showing an exemplary structure of a SIMD-typed processor of the image-area separation apparatus.
Figure 4:
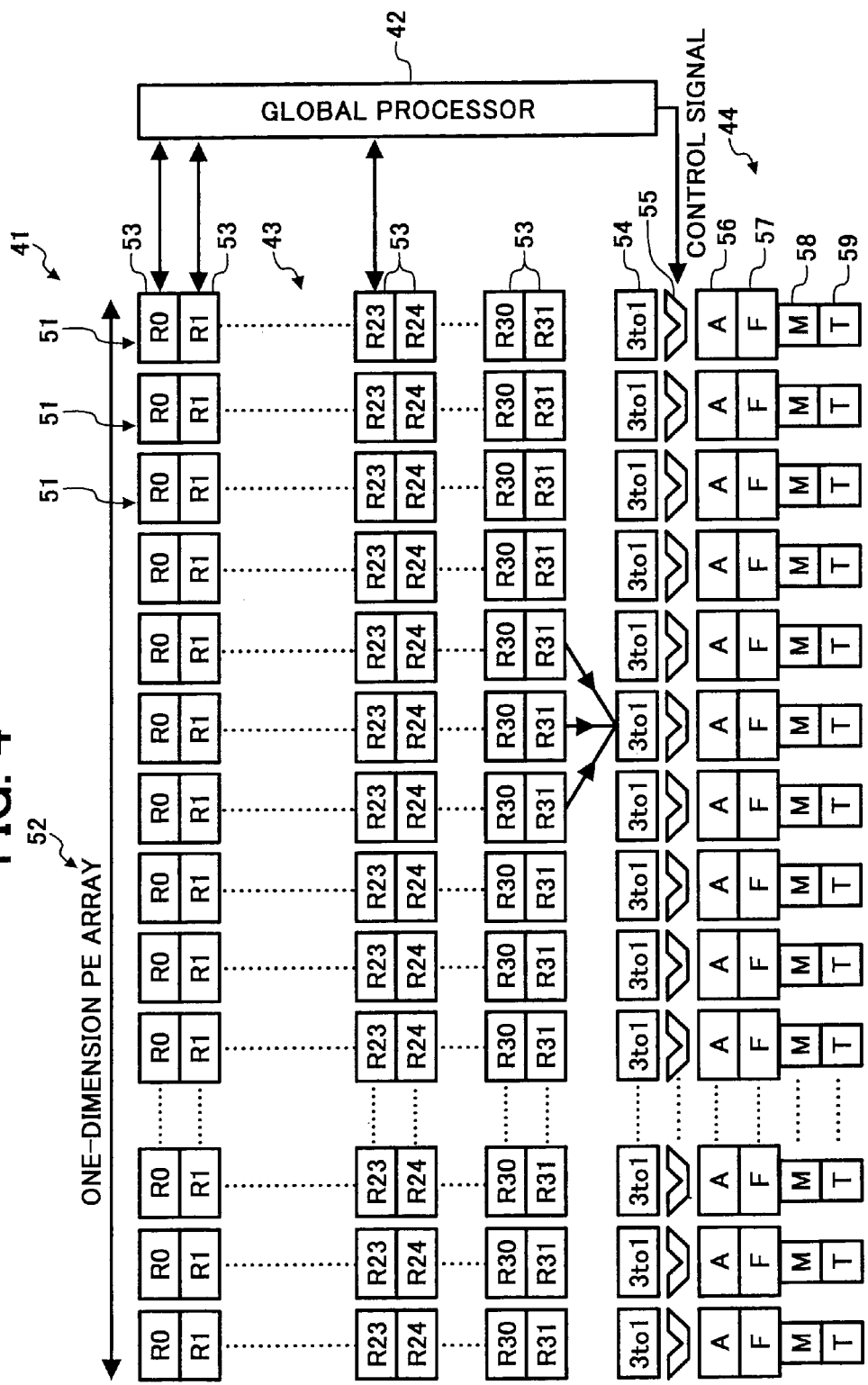
FIG. 4 is a block diagram showing an exemplary structure of the SIMD-typed processor.

Referring to FIGS. 3 and 4, the SIMD-typed processor 41 includes a global processor (hereinafter referred to as the GP) 42, a register file 43 and an operation array 44. The GP 42 includes a program RAM (not shown) and a data RAM (not shown) for the image-separation operation and reads the control program for the image-separation operation and the image processing operation that are mounted in the ROM 45 and generates various types of image control signals through an image forming medium. The image signals are not only utilized for controlling various image data blocks included in the ROM 45 (FIG. 13) but are supplied to the register file 43 and the operation array 44. When the GP 42 executes an instruction, various kinds of operations and program control operations to perform the image-separation operation and image processing operation are performed with the use of a general-purpose register 53 and an arithmetic logic unit (ALU) (not shown) mounted in the SIMD-typed processor 41 as will be explained later.

The register file 43 stores print data processed by an instruction of a processor element (hereinafter referred to as the PE). The instruction of the PE is SIMD-typed and performs a uniform process simultaneously for a plurality of print data stored in the register file 43. The PE instructs to read specified print data from the register file 43 and it is from an instruction of the GP 42 that the PE controls to read and write the specified print data. The print data read from the register file 43 are transferred to the operation array 44. The print data transferred are processed in the operation array 44 and are written into the register file 43.

The operation array 44 performs the process for the image-separation operation in accordance with an instruction of the PE. The processes and controls associated with the image-area separation operation and the image processing operation are performed by the GP 42.

Referring now to FIG. 4, the SIMD-typed processor 41 which is a one-dimension arranged SIMD-typed processor executes a single instruction with a high degree of parallelism for one or more print data. As shown in FIG. 4, the register file 43 includes one-dimension arranged processor element (PE) array 52 including a plurality of the PEs 51.

The GP 42 includes a program counter (PC) (not shown) which stores each of the program addresses, a general-purpose register (not shown) for storing operation data used for the image-separation operation, a stack pointer (SP) (not shown) to store each of the RAM addresses of the area in which the print data are saved at the time of data register save and restore, a link register (LS)(not shown) to store the originating address when calling the subroutine, an LI register (not shown) and an LN register (not shown) to store the branch point address of data at the time of interrupt request and non-maskable interrupt and a processor state register (not shown) to store a state of the SIMD-typed processor 41.

The GP 42 executes an instruction of the GP with the use of an instruction decoder (not shown), an arithmetic logic unit (ALU) (not shown), a memory control circuit (not shown), an interrupt control circuit (not shown), an external I/O control circuit (not shown) and a GP arithmetic control circuit (not shown). The GP 42 also controls the register file 43 and the operation array 44 when executing a PE instruction 43 with the use of the instruction decoder (not shown), a register file control circuit (not shown) and a PE arithmetic control circuit (not shown).

The register file 43 includes one-dimension arranged PE array 52 including 256 PEs 51. Each of the PEs 51 includes thirty-two registers 53 each with a predetermined bit width of 8 bits. Each register 53 is called from R0, through R31 by every unit of the PE 51. The register 53 has one reading port and one writing port to be interconnected to the operation array 44 and may be accessed from the operation array 44 through a bus with 8 bits which is readable and rewritable. Twenty-four out of the thirty-two registers 53 which correspond to the registers R0 through R23, respectively, are allowed to be accessed from an external equipment and with an input from an external equipment clock, an address and read/write control for the image-separation operation, specified image data may be read and written onto the specified register 53. Although the remaining eight registers which correspond to the registers R24, respectively, through R31, are used for temporarily storing process data for the PE arithmetic, the image data stored in the RAM of the GP 42 may be written therein. The data stored in the RAM of the GP 42 may be written into one or more of the PEs 51 which satisfy a condition that is specified by the write control by the GP 42 and a condition of a condition register 58 or T register 59. Because the data RAM has an output port of 64 bits width, image data may be written simultaneously in eight registers R24 through R 31 for one PE 51, allowing a total of 64-bit data to be written.

The operation array 44 includes the 16-bit ALU 55, a 16-bit A register 56, an F register 57 and a condition selector 59. The process is performed by the PE in such a manner that the image data read from the register file 43 or the data transferred by the GP 42 are input to a half part of the ALU 55 on one hand and that on the other hand the information contents of the A register 56 are input to the other half of the ALU 55 and the arithmetic results are stored in the A register 56. Thus, an arithmetic operation is performed between the A register 56 and the registers 53 of R0 through R31 or between the A register 56 and the data given by the GP 42. The data of the 8-bit register file 43 are input to the ALU 55 by a shift and expansion circuit (not shown) mounted on the connection part with the operation array 44 with arbitrary bit shifted to left.

The registers 53 are sequentially connected one to another through an address bus or a data bus (not shown) where instruction codes to specify operations and the target data to be processed are stored. The information contents of the register 53 are input to the ALU 55 and the process results are stored in the A register 56. To retrieve data result produced in the process of the image-area operation and the image processing operation to an external equipment from the PE 51, the data are temporarily saved in the F register 57. By retrieving the contents of the F register 57 the result data after the execution of the data process for the target data may be attained. The instruction code is given as uniform contents but in a different status for every PE 51 and each of the PEs 51 refers to the contents of the data stored in the register 53 of another adjacent PE 51 in the multiplexer 54. The operation results are further processed in a parallel processing and are input to each of the A registers 56.

Referring back to FIG. 13, in accordance with the control program for the image-separation operation and the image processing operation which is stored in the ROM 45, the SIMD-typed processor 41 operates in the RAM 46 as a work area and by so doing each of the processes of the Steps S1 through S4 described above is performed.

Detailed contents of the necessary process will be explained below.

Referring to FIG. 5, the edge test process in Step S1 to determine whether or not specified image data have edge components is explained. Assuming that a pixel value of a pixel of interest as f11, it may be determined whether the pixel of interest in units of pixel components is an edge component by a bias between one pixel value and a group of three pixels by three surrounding pixels. More specifically, the pixel of interest, in other words, the pixel of interest f11 is determined to be an edge component when one of the following inequalities is satisfied. |f11−f00|>thr$_{edge}$, |f11−f01|>thr$_{edge}$, |f11−f02|>thr$_{edge}$, |f11−f10|>thr$_{edge}$, |f11−f12|>thr$_{edge}$, |f11−f20 |> thr$_{edge}$, |f11−f21|>thr$_{edge}$ and |f11−f22|>, wherein the symbol thr$_{edge}$"| |" is a calculation formula that gives an absolute value and thr$_{edge}$ is a pre-determined threshold.

The dotted image test process in Step S2 to determine whether or not image data contain dot components is explained.

Figure 7:
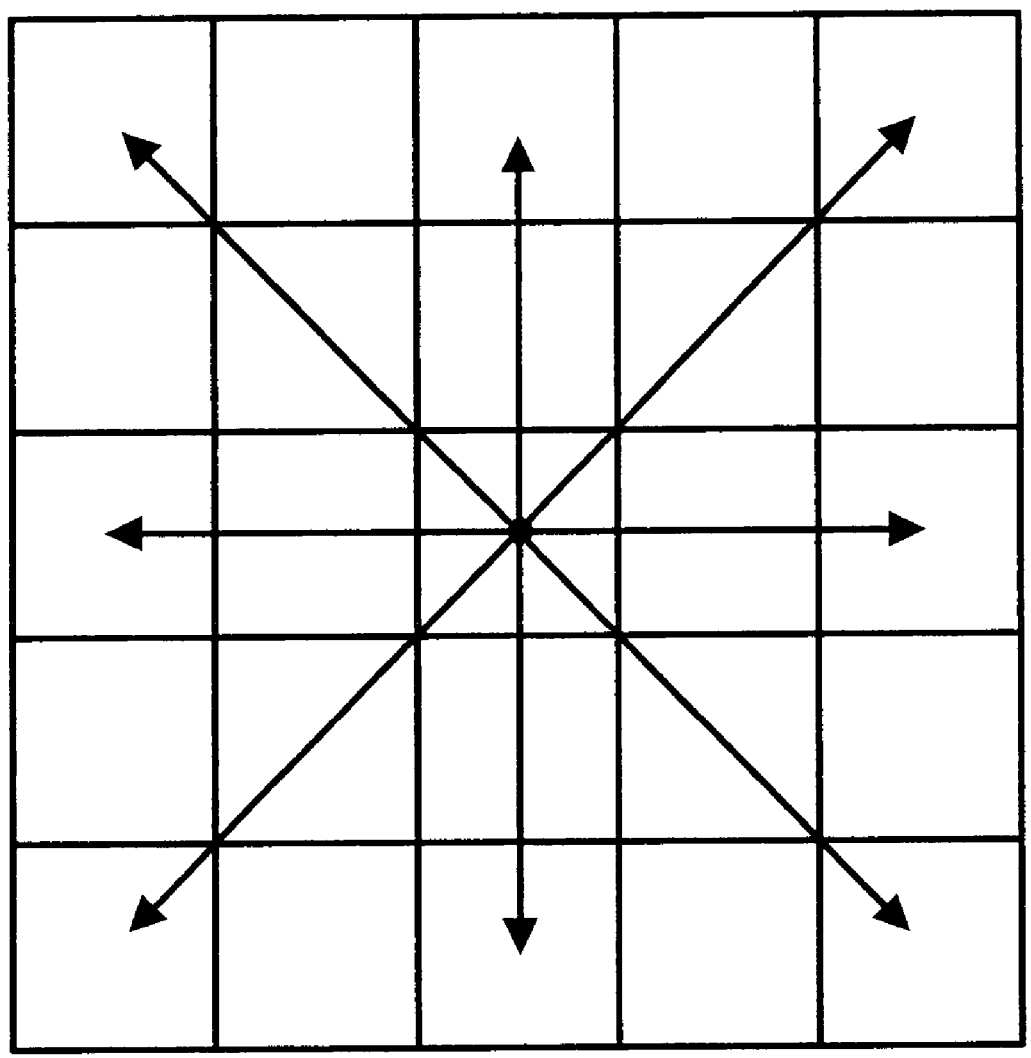
FIG. 7 is an illustration showing an exemplary process of the dotted image determination.

Referring to FIGS. 6 and 7, assuming that a pixel value of the pixel of interest is given as f22, it is determined whether the pixel of interest is a dotted image with the use of a bias of a pixel value from surrounding five pixels×five pixels. More specifically, assuming the following conditions are given: t1=|f22*2−(fD2+f42)|, t2=|f22*2−(f20+f24)|, t3=|f22*2−(f00+f44)| and t4=|f22*2−(f04+f40)|, and when the following inequalities are satisfied:

t1>thr$_{edge}$, t2>thr$_{edge}$, t3>thr$_{edge}$ and t4>thr$_{edge}$.

The pixel f22 of interest is determined as a dotted image. It is noted that the symbol "| |" is a calculation formula as is same with described above, to calculate an absolute value and thr$_{edge}$ is a pre-assigned threshold.

The line screen test process in Step S3 (FIG. 2) to determine whether or not image data have a line screen is explained.

Figure 8:
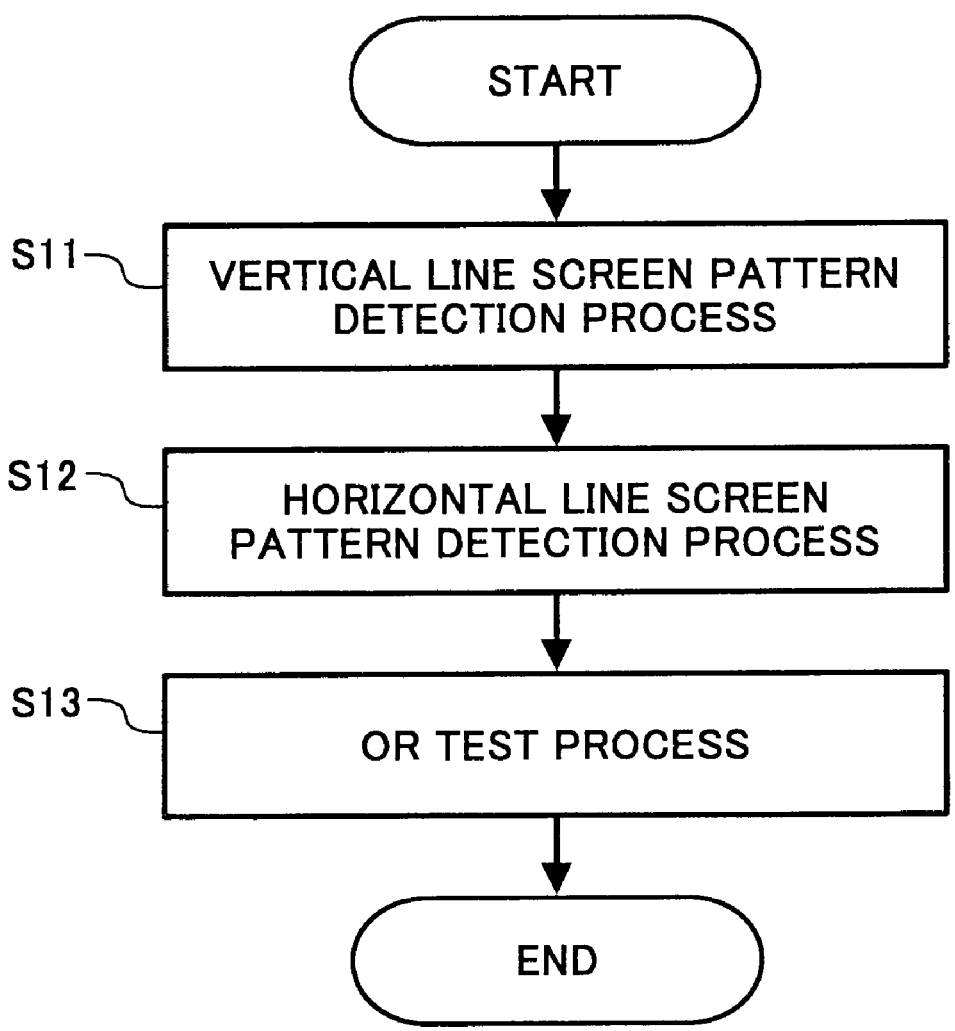
FIG. 8 is a block diagram showing an exemplary structure of a line screen determination method.

Referring to FIG. 8, a flowchart shows an exemplary process performed in Step S3 by the line screen test process. As shown in FIG. 8, the exemplary process performed in Step S3 in the line screen test process includes a vertical line screen process to detect a line screen composed of a plurality of lines which spread from one point to the other point along in the sub-scanning direction in Step S11, a horizontal line screen process to detect a line screen composed of a plurality of lines which spread from one point to the other point along in the main-scanning direction in Step S12 and the comprehensive test process to detect existence of a line screen in Step S13 with reference to both of the test result of the vertical line screen process and the horizontal line screen process.

Figure 9:
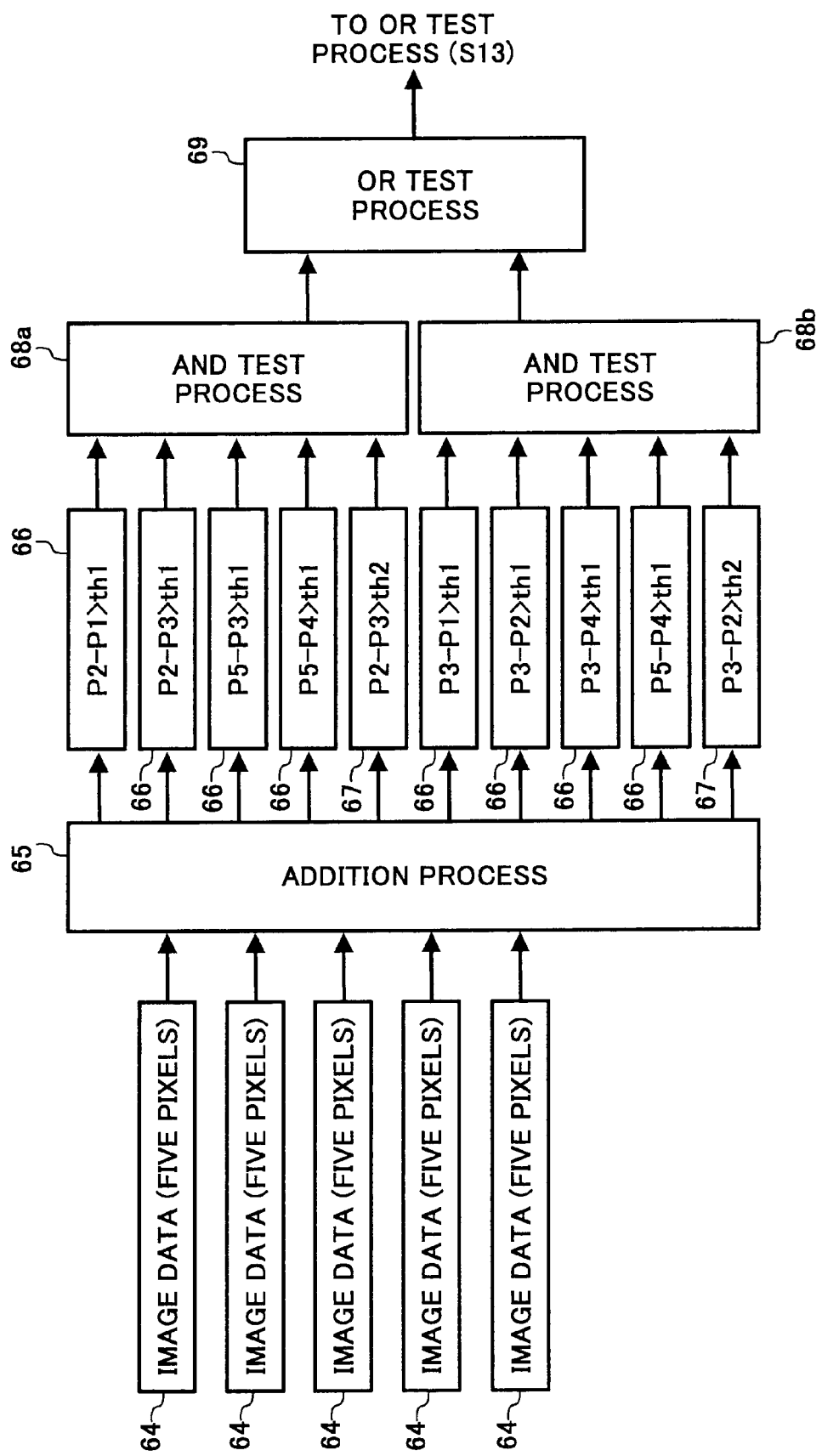
FIG. 9 is a block diagram showing an exemplary structure of a vertical line screen determination unit.

Referring to FIG. 9, a block diagram shows a process of the vertical line screen process in Step S11. As shown in FIG. 9, the vertical line screen process in Step S11 performs an addition processing 65 to add a pixel value amounting to five pixels arranged in a unit of row to each one of five data streams of image data 64, which is a unit of the image data handled by the vertical line screen process and which includes a total of five pixels widthwise and five pixels latitudinally. Eight patterns of addition/comparison processes 66 and two patterns of addition/comparison processes 67 are performed for five addition values from P1 through P5. In other words, the calculation allows for subtraction between an addition value and another adjacent addition value among the addition values P1 through P5 and the subtraction results and predetermined values th1 and th2 are compared with the predetermined th1 and th2 and two types of logical AND test processes 68a and 68b are performed for the above-described results. In each AND test processes 68a and 68b, logical AND between the four types of subtraction/comparison processes 66 and one type of the subtraction/comparison process 67 is carried out and the result of logical AND is obtained and a logical OR is also obtained through the OR test process.

Figure 10A:
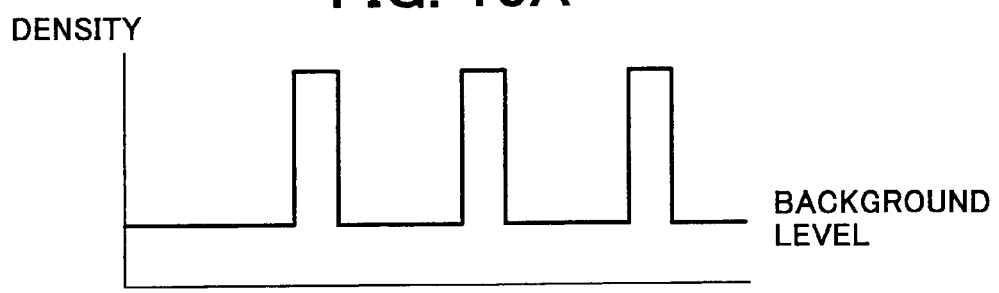
FIG. 10 is an illustration showing an exemplary process of a line screen determination.
Figure 10B:
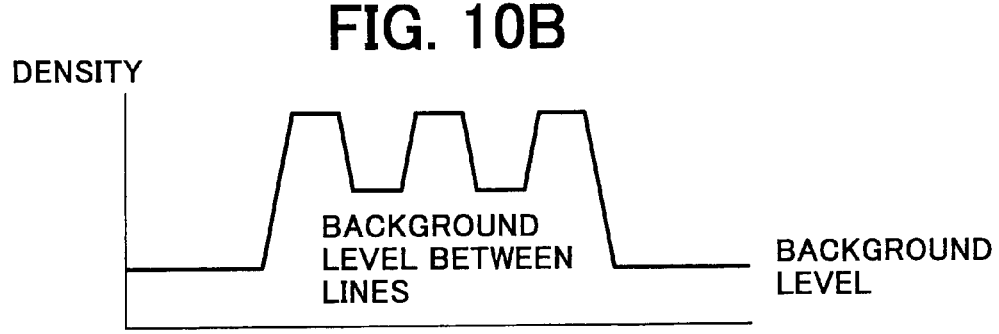
Figure 10C:
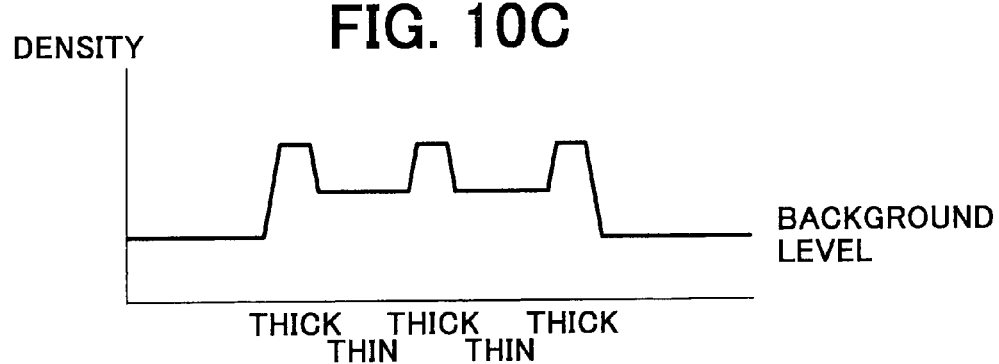
Figure 10D:
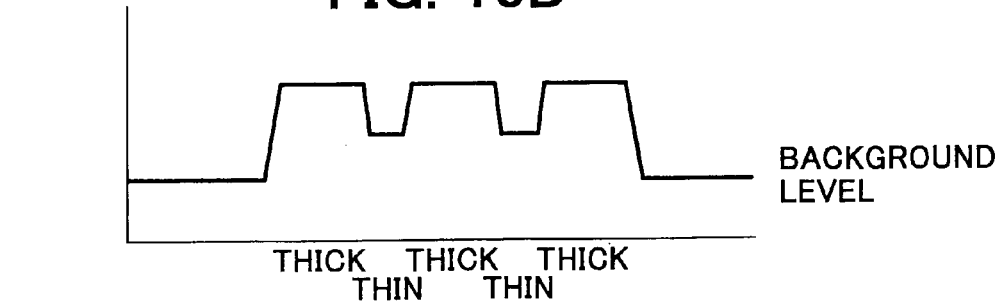

Referring to FIGS. 10A, 10B, 10C and 10D, a series of processes performed in Step S3 in the line screen test process are explained. FIGS. 10A, 10B, 10C and 10D show the relation between a position of an image in the horizontal line and the density in the vertical line. An ideal pattern of image of lines in characters is FIG. 10A. However, in an actual image such as characters, for example, the edge portion may be blurred as shown in FIG. 10B. Because the figure portion whose gradation is represented in line screen image includes a plurality of lines, the same applies to the above-described characters and an ideal image is the image as shown in FIG. 10A. However, as is the case with character portion, the edge portion is also smoothed as shown in FIGS. 10C and 10D. The figure shown in FIG. 10C is a relatively thin image portion and the figure of 10D is a relatively thick image portion. The images in FIGS. 10A, 10B, 10C and 10D are formed in an electro-photographic technology so that a certain level of density exists in the white background level portion because toner scatters on the background level which correspond an area between the black density levels. Hence, the bias of the density levels between a black figure portion and the white background portion becomes smaller in FIGS. 10C and 10D due to the bias of the density levels between black line in character portion and the white background of FIG. 10B.

Figure 12:
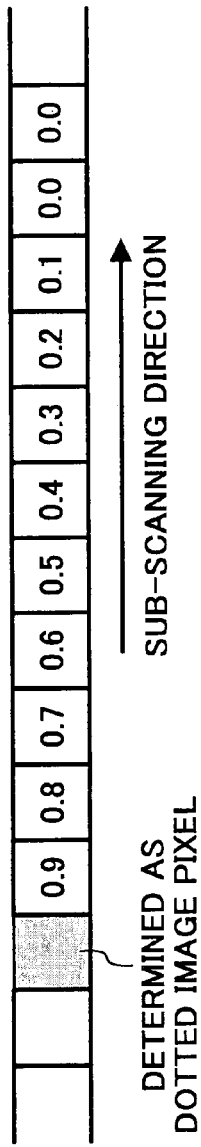
FIG. 12 is an illustration showing an exemplary process to determine precisely a dotted image included in the line screen to prevent a dotted image area from extremely expanding and from reaching to an image area that is not a dotted image.

Referring to FIG. 12, a test pattern process to determine the figure portion including the line screen described above will be explained. In the line screen test process in Step S3, the test pattern process is performed with reference to an adjacent pixel of the pixel of interest as shown in FIG. 12. As input image signal explained in Step S3 of the line screen test pattern process, any of the R, G, B image signals, such as a green signal(G), for example, may be used as well as luminance signals produced through the conversion of the R, G and B signals into a luminance signal Y, for example.

Figure 11:
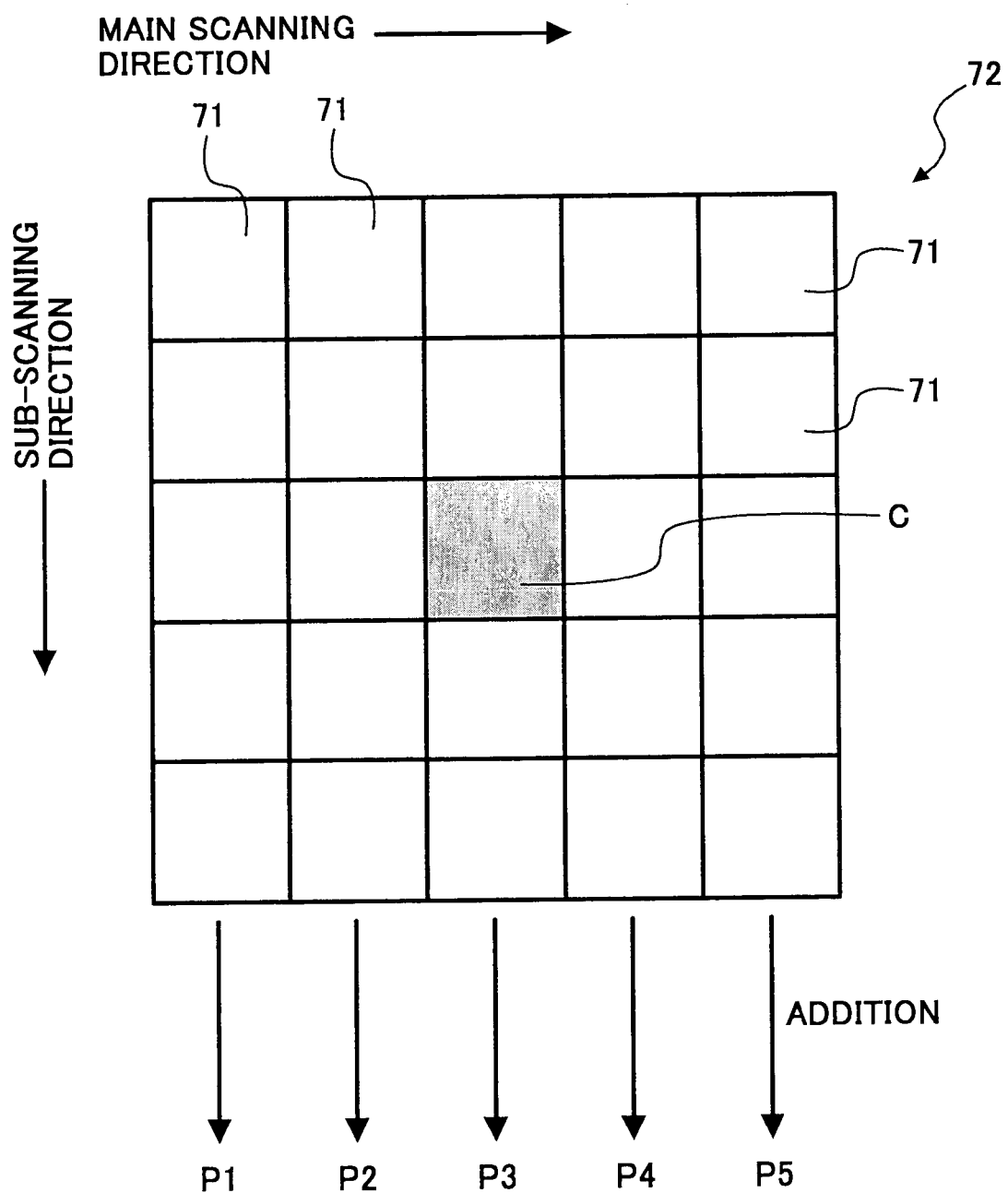
FIG. 11 is an illustration showing an exemplary process of the line screen determination method.

Referring to FIG. 11, a vertical line screen pattern test process performed in Step S11 will be explained. In one example, it is assumed that an image area 72 including a total of twenty-five pixels by five pixels 71 with a pixel of interest at the center of the pixels 71. The vertical line screen is an object to be observed in the example in the vertical line screen pattern test process in Step S11 and the vertical line screen referred to includes two or more lines which spread from one point to the other point along in the sub-scanning direction and these sequentially varying lines with respect to thickness represent widthwise image gradation. The object of lines of interest includes an example of the vertical line screen consisting periodical cycle of one line with high density and two lines with low density. Each pixel value of the pixels 71 latitudinally along in the sub-scanning direction of the image data 64 (FIG. 9) is addition-processed in the process of an addition process 65. Therefore, unevenness of the image data density of pixels is determined sequentially in a line direction such as the main-scanning direction by five pixels, for example. With the use of the addition values P1, P2, P3, P4 and P5, it is determined whether or not in eight patterns of the subtraction/comparison processes 66 (FIG. 9) the image data of five pixels whose unevenness of image density has been determined match the object line screen pattern such as the one having sequential cycle of the combination of one line with high density and two lines with low density, for example. For the purpose mentioned above, the following calculation is performed. More specifically, in the case of the combination of one thick line and two thin lines, any combination patterns in terms of sequential lines include either the pattern of thin, thick, thin, thin and thick or the pattern of thin, thin, thick, thin and thick may be applied so that it is determined that in the following step the addition values P1, P2, P3, P4 and P5 match either of the above-described two patterns. As shown in FIGS. 10C and 10D, visible pixel values which are seen thick or thin lines radically change according to whether the figure portion adjacent to the pixel of interest C (FIG. 11) is a thick portion or a thin portion. Therefore, the density such as thick and thin, for example, is not an absolute value but is determined as a relative value determined in comparison with the adjacent pixels.

Referring back to FIG. 9, when the following conditions are satisfied: P2−P1>th1, P2−P3>th1, P5−P3>th1 and P5−P4>th1 with th1 referring to a threshold, the five pixels referred to so far are determined as a line screen and the information that the five pixels are a line screen is output to the AND circuit 68a with reference to 4 subtraction/comparison processes 66. The value is input to an AND circuit and is processed in an AND test process 68a. In this case, the addition values P2 and P5 are determined, respectively, as relatively thick in density in comparison with adjacent addition values so that the five pixels of the image data coincide with a pattern of combination of thin, thick, thin, thin and thick patterns. Because the pixel of interest C is determined as including line screen and the signal output is ON which indicates that the image data are a line screen.

Accordingly, when the following conditions are satisfied: P3−P1>th1, P3−P2>th1, P3−P4>th1 and P5−P4>th1, the five pixels are determined as a line screen and the information that the five pixels are a line screen is output to the AND test process 68b with reference to four patterns of the subtraction/comparison processes 66 and the value is input to the AND circuit 68b and is processed in an AND test process 68b. In this case, the addition values P3 and P5 are determined, respectively, as relatively thick in density in comparison with adjacent addition values so that the five pixels of the image data coincide with a combination pattern of thin, thin, thick, thin, and thick.

As shown in FIG. 9, to precisely determine a character portion where the pixel of the image data include lines in high density of FIG. 10B from a line screen portion, determination that th2 of an inequality P2−P3<th2 is a predetermined threshold and that the inequality P3−P2<th2 is satisfied is performed with reference to a subtraction/comparison unit 67b, respectively. The respective test results produced from the logical AND process described above are calculated in any of the AND test processes 68a and 68b, respectively. As described above, in the case of electro-photography, because the bias of the density level in black part of the character and the white background level is smaller than the bias between the density level of a black portion of a figure and the background level, the subtraction/comparison process 67 adopts a determination method that when there is too outstanding a bias between a thick portion and a thin portion, an L level signal is output and an image is determined as not a line screen.

In the AND test process 68a, the five pixels of the image data match the patterns of thin, thick, thin, thin, and thick by outputting the information to each of the AND circuits, respectively, obtaining an AND result from four patterns of the subtraction/comparison processes 66 and one pattern of the subtraction/comparison process 67. When the bias between thick and thin patterns is not too great, the five pixels of the image data processed in the AND process are determined as a line screen. Accordingly, in the AND test process 68b, the pixel of the image data match the patterns of thin, thin, thick, thin and thick by outputting the information to each of the AND circuits and obtaining AND result from four patterns of the subtraction/comparison processes 66 and one pattern of subtraction/comparison process 67. When the bias between thick and thin patterns is not too great, the five pixels of the image data are determined as a line screen.

In the OR test process 69, a test process to determine a pixel of interest C is a pixel that includes a line screen or not.

A horizontal line screen pattern test process in Step S12 performs similar process to the vertical line screen pattern test process except for the direction of lines which spreads from one point to the other point along in the sub-scanning direction in the vertical line screen test process replaced by the main-scanning direction which spreads from one point to the other point along in the horizontal line screen pattern test process. Specifically, the horizontal line screen pattern test process is identical with the vertical line screen pattern test process in that an image area 72 including five pixels.times. five pixels 71 totaling at 25 pixels with the pixel of interest placed at the center of the 25 pixels. Components that are included in the horizontal line screen pattern test process are a plurality of the horizontal line screens. The horizontal line screen referred to hereinafter includes a plurality of lines which spread from one point to the other point along in the main-scanning direction and these sequentially varying line with respect to thickness latitudinally represent image gradation. The object line screen includes an example of a horizontal line screen including one line with high density and two thin lines with low density.

In more detail, the horizontal line screen pattern test process performs calculation similar to that of the addition process 65 of FIG. 9, sequentially adding the five series of pixel values in a unit of column to the respective lines of image data. Thereby, the horizontal line screen pattern test process obtains addition values P1 through P5 which indicates unevenness of the respective image data in the sub-scanning direction. Then, the horizontal line screen pattern test process sequentially delays the addition values P1 through P5 by every one line as shown in the subtraction/comparison processes 66 and 67 of FIG. 9. Thus, it may be determined whether the density of image data in the sub-scanning direction matches either of a pattern thin, thick, thin, thin and thick or with a pattern thin, thin, thick, thin and thick. When a difference between thickness and thinness of image data is too large in the sub-scanning direction, the image data may not be determined as a line screen. The processs identical to the AND test processes 68a and 68b of FIG. 9 and OR test process 69 of FIG. 9 are performed, a determination to determine whether the horizontal line screen is included is carried out.

An OR test process in Steps S13 allows a test result to be obtained by inputting an image data from one of the AND test circuits to an OR test circuit obtaining the processing result created from a test result of the vertical line screen pattern test process. The results of the vertical line screen pattern test process using the AND circuits and the horizontal line screen pattern test using the OR circuit enable a test result determining whether or not the vertical line screen or the horizontal line screen exists to be provided.

As mentioned above, both the vertical line screen pattern test process in Step S11 and the horizontal line screen pattern test process in Step S12 include steps of detecting a line screen including one line with high density and two lines with low density. Because when detecting a line screen with high density, it is a commonplace that a sequential pattern of one thin line and two thick lines, an additional subtraction/comparison process 66 is required to be performed.

A comprehensive test process in Step S4 allows a test process to determine whether or not each pixel 71 is a character portion or a figure portion with reference to each of the test result of the edge test process in Step S1, the dotted image test process in Step S2 and the line screen test process in Step S3. For example, when the image data are determined as containing an edge component in the edge test process in Step S1, determined as not containing a dot component in the dotted image test process in Step S2, and determined as not including a line screen in the line screen test process in Step S3, the corresponding pixel is determined as a character portion, and when at least one of the above-determinations is failed, the corresponding pixel is determined as a figure portion. The test signal thereof is output to the image processing unit 7.

In the copying machine 1 according to the preferred embodiment of the present invention, a test signal representing either a character portion or a figure portion output from the image-area separation apparatus 13 is output to the image processing unit 14. According to the test result in the image area-separation apparatus 13, the information contents of the image processing performed in the image processing apparatus 14 are switched over.

More specifically, when the edge emphasis filter circuit 25 receives a test signal which has determined that specified image data are a character portion, the edge emphasis filter circuit 25 outputs a signal indicating that the edge emphasis filter circuit 25 has performed an edge gradation process for data of the pixel 71 of FIG. 11, for example, which has been determined as a character portion. When the edge emphasis filter circuit 25 receives a test signal which has determined that specified image data are a figure portion, the edge emphasis filter circuit 25 outputs a signal indicating that the edge emphasis filter circuit 25 has not performed an edge gradation process for data of the pixel 71 of FIG. 11, for example, which has been determined as a figure portion, In accordance with the test result produced from the image-area separation apparatus 13, the information contents of an image compensation may change in the color compensation circuit 24 and an appropriate smoothing may be performed in the smoothing filter 22.

Therefore, with the above-described structure of the copying machine 1, the copying machine can carry out the image-separation to separate character images from figure images by means of software while the SIMD-typed processor achieves a high-speed image data processing.

Next, the following embodiment is similar to the embodiment described so far except for the information contents of a dotted image test process performed in the dotted image test process and a use of a table converter 81 as is explained later using together the SIMD-typed processor.

The contents of the process performed in Step S2 in the dotted image test process is such that as shown in FIGS. 6 and 7 it is determined whether or not a pixel of interest is a dotted image with respect to a bias of pixel value with the surrounding five pixels by five pixels. In more detail, assuming the following conditions:

$$t1=|f22*2-(f02+f42)|, t2=|f22*2-(f20+f24)|,$$
$$t3=|f22*2-(f00+f44)|, \text{ and } t4=|f22*2-(f04+f40)|.$$

and, the pixel of interest F22 is determined as a dotted image when the following inequalities are satisfied:

th1>thrscreen, th2>thrscreen, th3>thrscreen and th4>thrscreen.

Therefore, the pixels determined as a dotted image are aligned sporadically in a form of dots. However, the dotted image including dot components may not always be determined as dots because of an influence by the status of printing of the read image data or by a noise problem. Hence, even though the image data are a dotted image, the image data are determined to be a character and the quality of the image are deteriorated. It is not desired that a measure be taken such as a narrowing of the span of a threshold thrscreen, for example, as a counter-measure against the above-described misjudgment to incorrectly determine the dotted image as a character to worsen the print quality, and as a result, the character portion that is not a dotted image may be determined as dotted image.

When image data that are substantially a dotted image are not correctly determined as a dotted image, t1 through t4 as described above are proposed to be compensated on the premise that there are dotted image surrounding the image data of interest, thereby making it more possible to precisely judge a dotted image as a dotted image.

Thus, when the pixel of interest is determined as a dotted image applying the algorithm described so far, it is possible to determine if a pixel of a dotted image that is included in a dotted image as dotted image in a precise fashion. Without excessively expanding the area of the dotted image to an area of a non-dotted image, the pixel which is included in the dotted image is precisely determined by applying a density level of the dotted image in accordance with the pixel of interest to the surrounding pixels.

More specifically, as shown in FIG. 12, when calculation of the following equations is performed when the weight coefficient w is defined with respect to a distance in the main-scanning direction between a pixel of interest and a specified pixel determined as a dotted image, a calculation is performed with the following equations.

$$t1\text{new}=t1*(1+w); t2\text{new}=t2*(1+w); t3\text{new}=t3*(1+w)$$
$$\text{and } t4\text{new}=t4*(1+w).$$

The pixel of interest can be determined as a dotted image when the above-described equations are finished and the values from $t1_{\text{new}}$ through $t4_{\text{new}}$ satisfy the following conditions, t1new=thrscreen; t2new=thrscreen; t3new=thrscreen and t4new=thrscreen.

In more detail, the following is an explanation referring to FIGS. 14A, 14B, 14C, 14D, 14E and 14F in which only t1 is referred to. However, the same applies to t2, t3 and t4. FIG. 14A defines pixels form px1 through px5 and indicates that the pixels from px1 through px5 are pixels that are included in a dotted image. FIG. 14B shows a calculation result of t1. FIG. 14C shows a result of the dotted image determination by t1 wherein the threshold is 75. In this example, a pixel px1 is determined as a dotted image. However, a pixel px5 is not determined as a dotted image. Because the pixel px5 is included in the dotted image, the pixel px5 may probably be determined as a dotted image. However, the pixel px5 may not be determined as a dotted image because the threshold of the pixel px5 is 48 and the value 48 is smaller than 75 which is the predetermined threshold px5. FIG. 14D refers to a value of w. The value w is determined accordingly with respect to a distance between the pixel px1 which is determined as a dotted image and a specified pixel as shown in FIG. 14D. FIG. 14E shows a calculation result of $t1_{\text{new}}$. FIG. 14F shows a dotted image determination result made by $t1_{\text{new}}$. FIG. 14F shows that a dotted image determination result by $t1_{\text{new}}$. As a result of the dotted image determination by $t1_{\text{new}}$, the pixel p5 is determined as a dotted image. In this way, a dotted image may be without fail detected as a dotted image which has once not been detected as a dotted image because of the noise problem, for example, by way of applying a degree of the dotted image density.

Meanwhile, the SIMD-typed processor 41 is provided with a feature to execute uniform process simultaneously, for example, when a plurality of instructions are given at the same time. In other words, a plurality of the PEs 51 may be calculated simultaneously in parallel except for, as shown in FIG. 14A, 14B, 14C, 14D, 14E and 14F, a process with hysteresis which may cause process result in the past to influence the following process in each of the processes. In the cases described above, the same process may not be executed simultaneously. An alternative is to sequentially perform each of the processes by every data. Otherwise, it is impossible to effectively use the process performed by the SIMD-typed processor 41.

For solving the above-described drawbacks, in the embodiment, sequential status transition processes are performed with the use of the hardware structure of the image-area separation apparatus 13 as will be described below so that it is preferable to perform a sequential process which applies a degree of the dotted image density level described so far in FIGS. 14A, 14B, 14C, 14D, 14E and 14F.

Figure 15B:
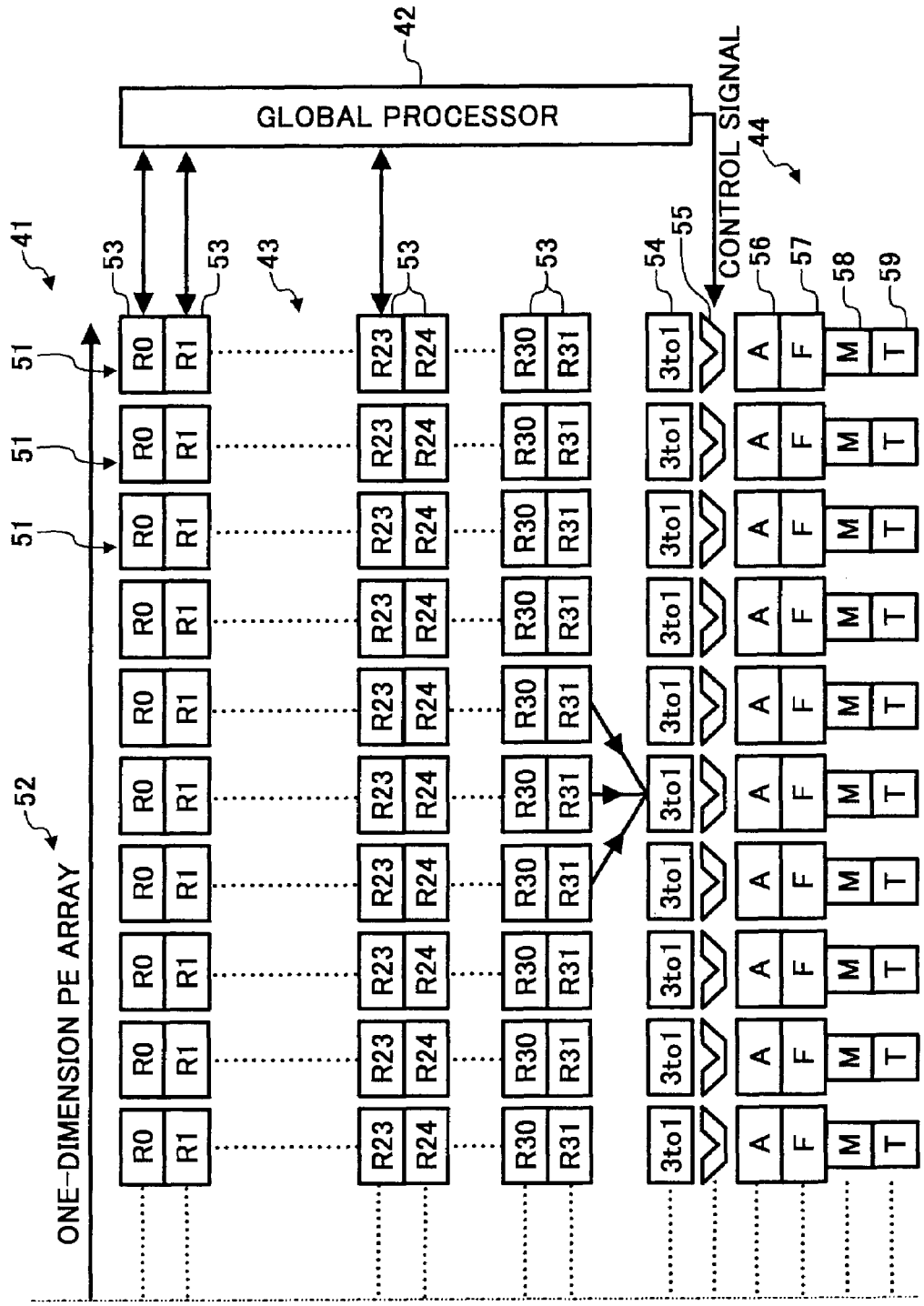
FIG. 15 is a block diagram showing a detailed structure of the SIMD-typed processor of FIG. 3 and also a block diagram of a table converter according to the preferred embodiment of the present invention.

Referring now to FIGS. 15A and 15B, a block diagram shows a hardware structure of the SIMD-typed processor 41. In FIGS. 15A and 15B, the hardware structure of the SIMD-typed processor 41 has already been explained except for a function of the register file 43 which allows for a reading and writing of the image data into the specified register 51 as well as a function provided with the register file 43 to enable an access from an external equipment through the SIMD-typed processor 41 to be possible as well as a control by the global processor 42.

The image-area separation apparatus 13 is provided with a table converter 81 combined with the SIMD-typed processor 41, a memory and register control circuit 84, a table (not shown) and an address generating device 82.

The table converter 81 reads a specified register file 52 of the register file 43 and writes data onto a specified register file 52 of the register file 43. The table converter 81 outputs to the address generating device 82 the data read from the register 51 and writes output data from a table RAM 83 into the register 51. The memory and register control circuit 84 inputs and outputs data with an external equipment. The table RAM 83 which will be explained later is provided with a function which performs conversion of tables. The address generating device 82 converts the data read from the register 51 into each of the addresses for the table RAM 83.

Because a nonlinear process generally involves extremely complexed programming and an arithmetic process require changes according to respective operation data, the SIMD-typed processor 41 applies a method for arithmetic calculation in which all the data after processing are compared with the data before processing, provided as a table and the data after processing may be obtained. In more detail, a value of the data before calculation to which a first address of a table is added in the address generating device 82 is obtained as an address pointer from the table RAM 83 and the data created from the above-described process may be the data after calculation. Because the calculation result data is fed back from the RAM 83 to the address generating device 82, it is possible to realize the process with histerisis which disseminates the process result to cause a previous table conversion result to influence another table conversion result that follows with the use of the above-mentioned feedback function. In this case, the purpose is not a table state conversion but an intended state transition according to the input sequence. Hardware configuration of FIG. 15A and 15B allows the next state to be output from the input data and a preceding state which refers to the data after conversion. This conversion may be carried out by subtracting the table RAM 83. In the embodiment, the input data are a dotted image determination result of 1 bit by t1 as shown in FIG. 14 C.

Referring to FIG. 16, the state is represented by 11 types of states of each having 4 bits in FIG. 16, which are categorized, according to a distance from the pixel, which is determined as a dotted image by t1 of FIG. 14D.

The states shown in FIG. 16 are determined according to a distance from the pixel which is determined as a dotted image by a trace quantity of t1. When the distance from the pixel which is determined as a dotted image by t1 is ten or more pixels, the sate value is the same in FIG. 16.

Figure 17:
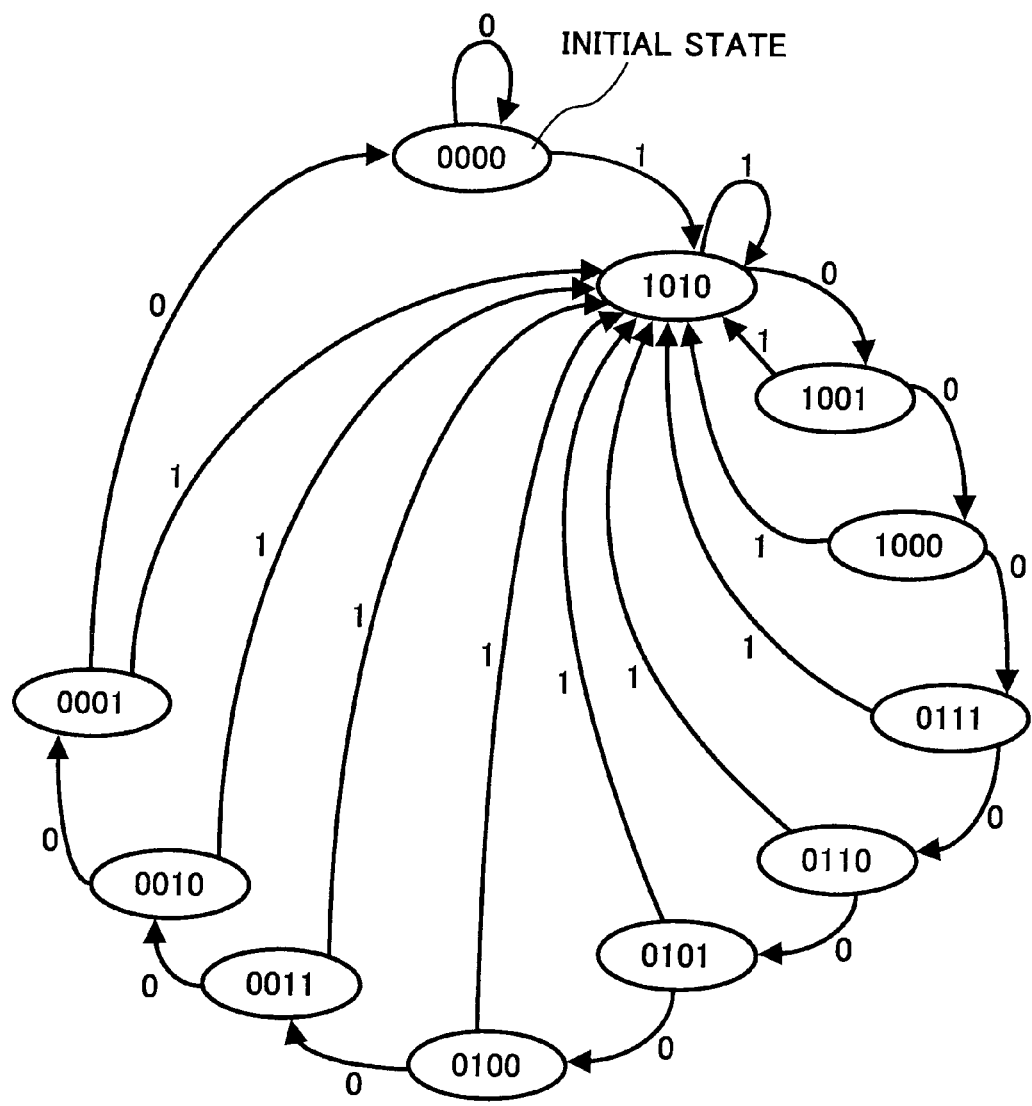
FIG. 17 is a state transition diagram showing a status associated with the table conversion using the table converter.

Referring to FIG. 17, state transitions by input data or 1-bit of the dotted image determination result by t1 are determined in the way as shown in FIG. 17. The input data, for example, a dotted image determination result of 1 bit which represents 1 when t1 is greater than $thr_{screen}$ and 0 when ti is equal to or smaller than $thr_{screen}$. In FIG. 17, a state is shown inside the ellipse, a state transition is shown by an arrow and a number which is written above the arrows shows an input value. The initial state when a sequential process starts is 0000. The information content of the table in the table RAM 83 with bit width of 32 bytes may be assigned according to each value in FIG. 18 and any number is assignable in the address 1011 or more because each of the corresponding addresses is not used.

As described so far, even though the image-area separation apparatus 13 involves a sequential process as well as the image-area separation operation, the SIMD-typed processor 41 is capable of calculating an intermediate image data by way of a SIMD-typed process and capable of performing a sequential process of the intermediate data by the table converter 81. By so doing, an image data processing is accelerated while software enabling the image-area separation process between a character portion and a figure portion to be realized.

This invention may be conveniently implemented using a conventional comprehensive purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed is:

1. An image-area separation apparatus, comprising:
   a SIMD processor performing a SIMD process for performing executing an image-area separation process using SIMD processing; and, said SIMD processor having an associated image area separating means configured such that said SIMD processor separates image data into a character portion and a figure portion;
   image-area separation means for performing an image-separation operation according to the SIMD process performed by the SIMD processor, comprising:
      a plurality of characteristic test means for performing a plurality of characteristic tests to determine whether the image data have specific characteristics; and,
      comprehensive test means for determining a comprehensive test result according to the plurality of the characteristic tests means performed by the plurality of test means,
   wherein said plurality of the characteristic means includes characteristic test means configured to determine whether the image data include edge data.

2. An image-area separation apparatus, comprising:
   a SIMD processor performing a SIMD process for performing executing an image-area separation process using SIMD processing; and, said SIMD processor having an associated image area separating means configured such that said SIMD processor separates image data into a character portion and a figure portion;
   image-area separation means for performing an image-separation operation according to the SIMD process performed by the MMD processor, comprising:
      a plurality of characteristic test means for performing a plurality of characteristic tests to determine whether the image data have specific characteristics; and, comprehensive test means for determining a comprehensive test result according to the plurality of the characteristic tests means performed by the plurality of test means, wherein said plurality of the characteristic means includes characteristic test means configured to determine whether the image data include dotted image data.

3. An image-area separation apparatus, comprising:

SIMD processor performing a SIMD process for performing executing an image-area separation process using SIMD processing; and, said SIMD processor having an associated image area Separeting means configured such that said SIMD processor separates image data into a character portion and a figure portion;

image-area separation means for performing an image-separation operation according to the SIMD process nerformed by the SIMD processor, comprising:

a plurality of characteristic test means for performing a plurality of characteristic tests to determine whether the image data have snecific characteristics; and, comprehensive test means for determining a comprehensive test result according to the plurality of the characteristic tests means performed by the plurality of test means, wherein said plurality of the characteristic means includes characteristic test means configured to determine whether the image data include line screen image data.

4. An image-area separation apparatus, comprising:

a SIMD processor performing a SIMD process for performing executing an image-area separation process using SIMD processing; and, said SIMD processor having an associated image area separating means configured such that said SIMD processor separates image data into a character nortion and a figure portion;

image-area separation means for performing an image-separation operation according to the SIMD process performed by the SIMD processor, comprising:

a plurality of characteristic test means for performing a plurality of characteristic tests to determine whether the image data have specific characteristics; and, comprehensive test means for determining a comprehensive test result according to the plurality of the characteristic tests means performed by the plurality of test means, wherein the plurality of characteristic test means include:

edge test means for determining whether the image data include the edge data, and;

dotted image test means for determining whether the image data include the dotted image data, wherein the comprehensive test means determines that the image data include the character portion when the edge test means determines the image data include at least one edge component and when the dotted image test means determines that the image data include no dotted image component, and determines that the image data include the figure portion when at least one of two events occurs in which the edge test means determines that the image data include no edge component and in which the dotted image test means determines that the image data include one of at least dotted components.

5. An image-area separation apparatus, comprising:

a SIMD processor performing a SIMD process for performing executingan image-area separation process using SIMD processing; and, said SIMD processor having an associated image area separating means contiaured such that said SIMD processor separates image data into a character portion and a figure portion;

image-area separation means for performing an image-separation operation according to the SIMD process nerformed by the SIMD processor, comprising:

plurality of characteristic test means for performing a plurality of characteristic tests to determine whether the image data have specific characteristics; and, comprehensive test means for determining a comprehensive test result according to the plurality of the characteristic tests means performed by the niurality of test means, the edge test means for detecting whether the image data include the edge data;

the dotted image test means for detecting whether the image data include the dotted image data; and a line screen test means for detecting whether the image data include line screen image data;

wherein the comprehensive test means determines that the image data include the character portion when the edge test means determines the image data include at least one edge component;

the dotted image test means determines that the image data include no dotted image component; and the line screen test means determines that the image data include no line screen; and wherein the comprehensive test means determines that the image data include the figure portion when at least one of the following three events occur:

the edge test means determines that the image data include no edge component;

the dotted image test means determines that the image data include one of at least dotted components; and the line screen test means determines that the image data include at least one of line screen components.

6. An image-area separation apparatus, comprising:

a SIMD processor performing a SIMD process for performing executing an image-area separation process using SIMD processing; and, said SIMD processor having an associated image area separating means configured such that said SIMD processor separates image data into a character portion and a figure portion;

image-area separation means for performing an image-separation operation according to the SIMD process performed by the SIMD processor, comprising:

a data converter for converting data using the data as an address stared in a register of a register file of said SIMD processor;

a data table convener connected to the SIMD processor for converting data of a data table using, as an address, data of a register provided to the SIMD processor;

wherein said image-area separation apparatus performs the image-area separation operation by causing the SIMD processor to perform the SIMD process and the data table converter to perform a sequential operation.

7. The image-area separation apparatus as defined in claim 6, wherein the image-area separation means is configured to require intermediate data in the SIMD process and to perform the sequential operation for the intermediate data.

8. A computer-readable program for image-area separation embodied on computer readable medium, said computer-readable program comprising processing routines which when executed by a SIMD processor, comprising the steps of:

causing the SIMD processor to perform the image-area separation for image-separating the image data into a character portion and a figure portion, causing said processor to execute a plurality of characteristic test means for performing a plurality of characteristic tests to determine whether the image data have specific characteristics; and a comprehensive test means for determining a comprehensive test result according to the plurality of the characteristic tests means performed by the plurality of test means, wherein one of a plurality of the characteristic test processes is an edge test process configured to determine that the image data include an edge component.

9. A computer-readable program for image-area separation embodied on computer readable medium, said computer-readable program comprising processing routines which when executed by a SIMD processor, comprising the steps of:
causing the SIMD processor to nefform the image-area separation for image-separating the image data into a character portion and a figure portion,
causing said processor to execute a plurality of characteristic test means for performing a plurality of characteristic tests to determine whether the image data have specific characteristics; and a comprehensive test means for determining a comprehensive test result according to the plurality of the characteristic tests means peformed by the plurality of test means,
wherein one of a plurality of the characteristic test processes is a dot image test process configured to determine that the image data include a dotted image component.

10. A computer-readable program for image-area separation embodied on computer readable medium, said computer-readable program comprising processing routines which when executed by a SIMD processor, comprising the steps of:
causing the SIMD processor to perform the image-area separation for image-separating the image data into a character portion and a figure portion,
causing said processor to execute a plurality of characteristic test means for performing a plurality of characteristic tests to determine whether the image data have specific characteristics; and a comprehensive test means for determining a comprehensive test result according to the plurality of the characteristic tests means performed by the plurality of test means,
wherein one of a plurality of the characteristic test processes is a line screen test process configured to determine that the image data include a line screen components of to image data.

11. A computer-readable program for image-area separation embodied on computer readable medium, said computer-readable program comprising processing routines which when executed by a SIMD processor, comprising the step of:
causing the SIMD processor to pcrfonn the image-area separation for image-separating the image data into a character portion and a figure portion,
wherein the image-area separation process causes the SIMD-typed processor to execute said SIMD process and to perform the image-area separation by allowing a table converter which performs a table conversion in which register data of the register file of the SIMD-typed processor are an address to execute a sequential process.

12. The computer-readable program as defined in claim 11, wherein the image-area separation process is configured to calculate intermediate data and to perform the sequential process in accordance with the intermediate data.

13. A computer-readable medium having stored thereon computer-executable instructions for execution by a SIMD processor which include the image-area separation, comprising:
said computer-readable program, comprising
processing routines executed by the SIMD processor, which performs the step of: causing the SIMD processor to perform the image-area separation for image-separating separate the image data into a character portion and a figure portion;
a plurality of characteristic test means for performing a plurality of characteristic tests to determine whether the image data have specific characteristics; and,
comprehensive test means for determining a comprehensive test result according to the plurality of the characteristic tests means performed by the plurality of test means,
wherein one of a plurality of the characteristic test processes is an edge test process conligured to determine that the image data include an edge component.

14. A computer-readable medium having stored thereon computer-executable instructions for execution by a SIMD processor which include the image-area separation, comprising:
said computer-readable program, comprising
processing routines executed by the SIMD processor, which performs the step of: causing the SIMD processor to perform the image-area separation for image-separating separate the image data into a character portion and a figure portion;
a plurality of characteristic test means for performing a plurality of characteristic tests to determine whether the image data have specific characteristics; and,
comprehensive test means for determining a comprehensive test result according to the plurality of the characteristic tests means performed by the plurality of test means,
wherein one of a plurality of the characteristic test processes is a dot image test process configured to determine that the image data include a dotted image component.

15. A computer-readable medium having stored thereon computer-executable instructions for execution by a SIMD processor which include the image-area separation, comprising:
said computer-readable program, comprising
processing routines executed by the SIMD processor, which nerforms the step of: causing the SIMD processor to nerform the image-area senaration for image-separating separete the image data into a character portion and a figure portion;
a plurality of characteristic test means for performing a plurality of characteristic tests to determine whether the image data have specific characteristics; and,
comprehensive test means for determining a comprehensive test result according to the plurality of the characteristic tests means performed by the plurality of test means,
wherein one of a plurality of the characteristic test processes is a line screen test process configured to determine that the image data include a line screen components of the image data.

* * * * *